United States Patent [19]

Knudsen

[11] 4,020,146

[45] *Apr. 26, 1977

[54] PRODUCTION OF URANIUM DIOXIDE

[75] Inventor: Irving E. Knudsen, Murrysville, Pa.

[73] Assignee: Westinghouse Electric Corporation, Pittsburgh, Pa.

[*] Notice: The portion of the term of this patent subsequent to Dec. 15, 1987, has been disclaimed.

[22] Filed: July 5, 1973

[21] Appl. No.: 376,847

Related U.S. Application Data

[63] Continuation-in-part of Ser. No. 843,062, July 18, 1969, abandoned.

[52] U.S. Cl. .................... 423/261; 252/301.1 R; 423/19; 423/253; 423/258
[51] Int. Cl.² .................... C01G 43/02; G21C 3/00
[58] Field of Search .......... 423/261, 19, 253, 258; 252/301.1 S, 301.1 R

[56] References Cited

UNITED STATES PATENTS

| | | |
|---|---|---|
| 3,160,471 | 12/1964 | Knudsen .................... 423/261 X |
| 3,235,327 | 2/1966 | Blundell et al. ............ 423/261 X |
| 3,547,598 | 12/1970 | Knudsen .................... 423/261 X |
| 3,765,844 | 10/1973 | Rode ......................... 423/261 X |

FOREIGN PATENTS OR APPLICATIONS 2,051,856  4/1971  France ........................... 423/261

*Primary Examiner*—Benjamin R. Padgett
*Assistant Examiner*—T. S. Gron
*Attorney, Agent, or Firm*—R. T. Randig; Z. L. Dermer

[57] ABSTRACT

A three stage fluidized bed process for converting uranium hexafluoride ($UF_6$) to a ceramic-grade uranium dioxide ($UO_2$) powder by first, reacting hydrogen and steam with $UF_6$ in a first fluidized bed in a temperature range of from about 475° to 600° C to form solid intermediate products $UO_2F_2$ and $U_3O_8$; second, reacting hydrogen and steam with the intermediate products in a second fluidized bed at a temperature ranging from about 575° to about 675° C to produce a second group of intermediate products including $UO_2F_2$, $U_3O_8$, and $UO_2$; and, third, reacting hydrogen and steam with the second group of intermediate products in a third fluidized bed at a temperature of 575° to 675° C to produce ceramic grade $UO_2$ powder having low residual content of fluorides and other foreign materials.

9 Claims, 1 Drawing Figure

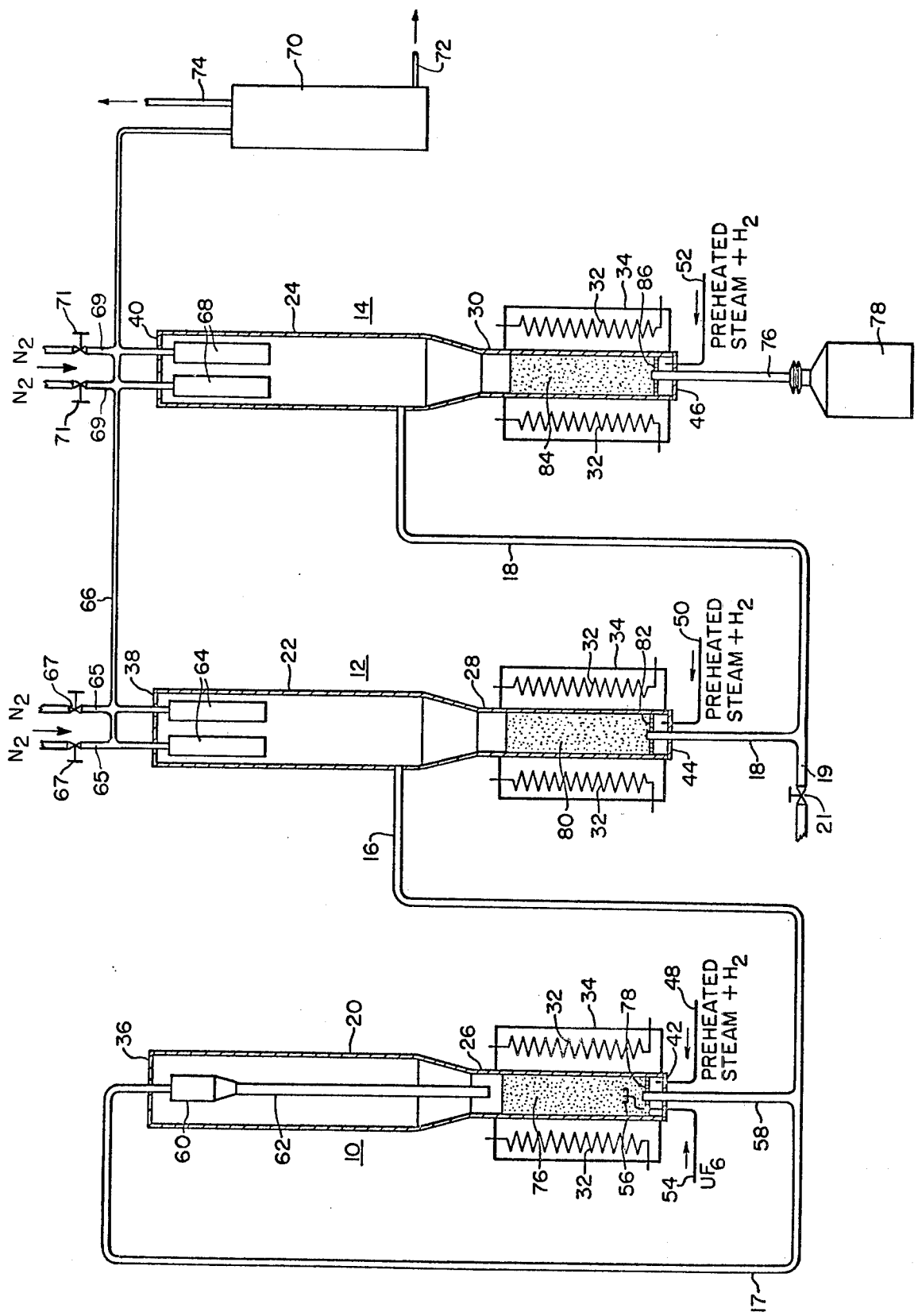

PRODUCTION OF URANIUM DIOXIDE

REFERENCE TO OTHER APPLICATIONS

This application is a continuation-in-part of application Ser. No. 843,062, filed July 18, 1969, now abandoned.

BACKGROUND OF THE INVENTION

1. Field of the Invention

This invention relates to the production of ceramic-grade uranium dioxide powder from $UF_6$. More particularly, it pertains to the substantially complete conversion of uranium hexafluoride to uranium dioxide by a continuous procedure involving three fluidized beds interconnected in series. Both enriched uranium hexafluoride and natural uranium hexafluoride as well as depleted uranium can be processed.

2. Description of the Prior Art

Uranium dioxide is a desirable fuel in nuclear reactors because of its excellent physical and chemical properties, such as inertness to cooling media, irradiation stability, and retention of fission gases. Having these properties uranium dioxide is suitable for use in both bulk and dispersion forms. Moreover, it is relatively easy to prepare and to fabricate into desired compacts, as well as being amenable to chemical reprocessing after irradiation. With the growing use of nuclear fuel in the electrical power field, a reduced cost of preparation would provide added incentive for further employment of uranium dioxide as fuel material.

One of the expedient methods for producing uranium dioxide is by the conversion of uranium hexafluoride. One method is that disclosed in U.S. Pat. No. 2,906,598 which primarily involves aqueous precipitation, filtration, drying, calcination, and reduction steps. Unfortunately, aqueous procedues ordinarily do not permit control of conditions that provide a uranium dioxide powder having the desired combination of uniformity and good sinterability and at a low cost. For that reason, fluid-bed processes are being more widely considered for the conversion of uranium hexafluoride to uranium dioxide powder.

One disadvantage of fluid bed processes having only one stage, as in U.S. Pat. No. 3,160,471, or two stages, as in U.S. Pat. No. 3,547,598, for converting $UF_6$ to $UO_2$ has been the relatively high residual fluorine values. Fluorine in $UO_2$ powder is undesirable because it sometimes adversely affects the sinterability of the powder. Further, although some fluorine is removed during the sintering operation, the fluorine has a corrosive effect on the sintering furnace parts and is highly undesirable in fuel elements because of its attack on the metal cladding. Unless the residual value of fluorine remaining in the sintered fuel pellet is extremely low, it reduces the life of the cladding in which the fuel pellet is encased. Moreover, such prior known gas phase processes have resulted in disappointingly low yields of enriched uranium recovery as $UO_2$ which is costly and wasteful, which fact has indicated a need for a more efficient method for recovering all of the uranium.

U.S. Pat. No. 3,179,491 discloses a single step process in which uranium yields of 89 to 91% are indicated which means about a 10% loss of the costly uranium.

U.S. Pat. No. 3,235,327 discloses a two-stage process which is dependent upon the use of relatively high volumes of nitrogen gas as a critical factor in the success of the disclosed process.

U.S. Pat. No. 3,168,369 discloses gas phase reaction of $UF_6$ and steam in a first reactor to produce very fine $UO_2F_2$ powder. The resulting $UO_2F_2$ powder must then be reacted in a calciner with hydrogen and stem to produce $UO_2$, with nitrogen gas being introduced. The recovery of the fine $UO_2F_2$ powder of 0.1 micron size and finer is very difficult and requires multiple recovery systems in series.

SUMMARY OF THE INVENTION

It has been found in accordance with this invention that the foregoing disadvantages may be overcome by the employment of a triple fluidized bed system by which a consistently high quality ceramic-grade uranium dioxide powder with very low fluorine residuals is produced. In the system uranium hexafluoride is fed into a first fluidized bed where it is converted at elevated temperatures by reaction with steam and hydrogen to a mixture of solids such as $UO_2F_2$, $U_3O_8$, $UO_2$, and the like. This mixture of solids with small amounts of impurities, is conveyed to a second fluidized bed where the mixture is further reacted, under conditions where it is not subject to the adverse effects of incoming uranium hexafluoride as occurs in the first bed, and further purified, in the presence of steam and hydrogen. The resulting mixture, composed of $UO_2$ with some $UO_2F_2$ and $U_3O_8$, is conveyed to and further reacted in a third fluidized bed reaction vessel in the presence of more steam and hydrogen to produce a consistently uniform ceramic-grade of uranium dioxide powder, which has very low fluorine residual values, and which is readily sinterable to a high density.

It is a general object of this invention to provide a three fluidized bed reactor process for the production of uranium dioxide powders from $UF_6$ in which the conditions for conversion of the $UF_6$ are readily controlled to produce a ceramic grade $UO_2$ powder of uniform quality.

BRIEF DESCRIPTION OF THE DRAWINGS

For a better understanding of the invention, reference is made to the accompanying drawing which is a schematic view partly in vertical cross-section of three interconnected fluidized bed reactors used for practicing the invention in one continuous process.

DESCRIPTION OF THE PREFERRED EMBODIMENT

As shown in the drawing, first, second, and third fluidized bed reactors are generally indicated at 10, 12 and 14, respectively. The reactors are interconnected in series by conduits, namely a conduit 16 between the reactors 10 and 12 and by a conduit 18 between the reactors 12 and 14.

The reactors 10, 12 and 14 are hollow cylindrical shells arranged with their axes being vertical. The upper portions 20, 22 and 24 may have larger internal diameters than do their related lower portions 26, 28 and 30, respectively. However, the upper and lower portions of each reactor may be of essentially the same internal diameter. Thermal insulation is applied about the exterior of each reactor. The lower portions 26, 28 and 30 are enclosed within heating means as, for example, electric resistance elements 32 and housings 34. The upper ends of the reactors 10, 12 and 14 are closed by covers 36, 38 and 40, respectively, and the lower ends are closed by covers 42, 44 and 46, which covers are detachably mounted in a manner not shown.

The first reactor 10 has an inlet 48 for introducing preheated stem and hydrogen at the lower end of the lower portion 26. Similarly an inlet 50 for introducing preheated stem and hydrogen is provided for the second reactor 12 at the lower end of the lower portion 28. Likewise, the third reactor 14 is provided with an inlet 52 for introducing preheated steam and hydrogen into the lower end portion 30 thereof.

The first reactor 10 is provided with a conduit 54 extending through the cover 42 and having an inner end provided with a gas distributor nozzle 56 to introduce uranium hexafluoride ($UF_6$) into the lower portion 26 of the reactor 10. However, good results have been obtained where the $UF_6$ gas is introduced through the side walls of reactor portion 26 and a single distributor nozzle is employed.

As shown in the drawing, the conduit 17 extends from the upper end portion 20 of the first reactor 10 to a lowermost end where it joins the place where the outlet of a conduit 58 joins conduit 16, the latter extending from the lower end of the reactor 10 to the upper portion 22 of the second reactor 12. The conduit 58 carries solid powders formed by reaction in the fluidized bed from the bottom portion 26 into conduit 16. By this arrangement, the pressure of the off gases from the upper end of the reactor 10 provide pneumatic means for conveying the reactant powder products to the second reactor 12. The solid powder product of the second reactor 12 passes through the conduit 18 to the third reactor 14.

While the upper end portion 20 is shown in the drawing as being of larger diameter than portion 26, in practice good results have been obtained when the diameter was essentially uniform throughout.

A cyclone separator 60 is provided within the upper portion 20 of reactor 10 for separating coarser particles of reaction products from the finer particles which latter are suspended in the gas and pass through the conduit 16. The coarser particles caught in the cyclone separator drop down and are returned to the lower reactor portion 26 through a conduit 62.

In the second reactor suitable filters 64 are provided in the upper portion 22 thereof for separating the fine solid reaction products from the spent gases which are vented from the second reactor 12 through an outlet conduit 66. Likewise, in the third reactor 14 suitable filters 68 (similar to the filters 64) are provided for the same purpose and are connected to the outlet conduit 66 which carries gases such as HF, $H_2O$, and $H_2$ into an off gas scrubber 70 where the steam and HF are separated at outlet 72 and the other gases, primarily hydrogen, are released through a vent 74.

In order to dislodge any accumulated powder on the surfaces of filters 64 and 68, a supply of high pressure gas can be injected at selected times into line 66 directly above each filter. Thus a conduit 65 connected to a supply of nitrogen at, for example, 60 psig, and controlled by a solenoid valve 67 is directed to each filter 64, and a short duration reverse flow blast of nitrogen gas will clean each filter, ordinarily one at a time. Similarly conduit 69 directed into line 66 above each filter 68, and connected to a source of the high pressure nitrogen via solenoid valves 71 can be operated to dislodge any accumulations of powder on each of the filters 68.

FIRST REACTOR

The first reactor 10 functions to cause reactions essentially in accordance with the following equations:

$$UF_6 + 2H_2O \rightarrow UO_2F_2 + 4 HF \qquad (1)$$

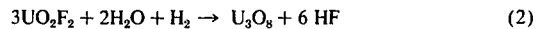

$$3UO_2F_2 + 2H_2O + H_2 \rightarrow U_3O_8 + 6 HF \qquad (2)$$

For that purpose uranium hexafluoride gas is introduced into the first reactor 10 through the nozzle 56 to react with controlled amounts of heated hydrogen and steam introduced through a conduit 48. For initiating and maintaining these reactions, a starting bed 76 composed of a mixture of particles of uranyl fluoride and uranium oxides is supported on a bubble cap distribution plate 78, and these particles have an upper level when fluidized near the upper end of the lower reactor portion 26 as indicated by the solid line.

The temperature within the lower portion 26 is maintained in the range of from approximately 475° to 600° C in order to obtain a ceramically active $UO_2$ powder at the completion of the process. The optimum temperature range appears to be 535° to 575° C. The reaction products are a mixture of $UO_2F_2$, $U_3O_8$, hydrogen fluoride gas (HF), and possibly small amounts of $UO_2$, $UO_3$ and $UF_4$, in addition to steam and hydrogen being present.

For each mol of uranium hexafluoride introduced into the first reactor 10, from about 2 to 8 mol of steam and from 1 to 8 mols of hydrogen, are used, with preferred proportions being from 3 to 6 mols of steam and from 2 to 5 mols of hydrogen. The steam and hydrogen are introduced into the reactor at temperatures of approximately 550° C. While the $UF_6$ gas can be introduced at about 80° C, preheating it to a temperature of from 100° to 250° C may be desirable.

A small portion of the solid reaction product having a particle size of about 40 microns and less, is carried out of the reactor with the off-gas escaping at the top of the reactor 10 through the conduit 17 to the second reactor 12. This elutriation technique limits the accumulation in the bed of the small particles, thereby minimizing channeling and agglomeration problems that may occur. In order to reduce the number of large particles, a stream of high pressure nitrogen—for example 10 to 70 psi—is injected into the fluidized bed so that large particles are broken up. A jet attrition discharge nozzle of from 20 to 75 mils in diameter for a 10 inch diameter reactor has given good results. A steady stream of the solid reaction products settles out of the fluidized bed and leaves the first reactor 10 through the lower end of conduit 58 as particles having a size ranging from about 10 to 1000 microns, preferably not exceeding 500 microns in diameter. In the upper end portion 20 of the first reactor 10, a mixture of steam, hydrogen, and hydrogen fluoride (HF) together with some of the finer particles of the reaction products leaves the reactor 10 through the conduit 17 and joins conduit 16 at conduit 58.

SECOND REACTOR

The second reactor 12 receives the reaction products from the first reactor 10 through the conduit 16. The products may be conveyed pneumatically as illustrated by use of off-gas from the first reactor. However other conveyance means such as mechanical conveyors may be employed. The uranium oxide and oxyfluoride compounds from the first reactor 10 are further reacted in the presence of additional steam and hydrogen in accordance with the following additional reactions:

$$UO_2F_2 + 2H_2O + H_2 \rightarrow U_3O_8 + 6 HF \qquad (3)$$

$$U_3O_8 + 2H_2 \rightarrow 3UO_2 + 2 H_2O \qquad (4)$$

$$UO_2F_2 + H_2 \rightarrow UO_2 + 2 HF \qquad (5)$$

The temperature within the lower reactor portion 28 is maintained in the range of from 575° to 675° C.

In the second reactor 12, the products are converted almost completely to the end product, namely, uranium dioxide ($UO_2$). For that purpose, for each mol of uranium in the $UO_2F_2$ and $U_3O_8$, about 4 to 12 mols of steam and 1 to 6 mols of hydrogen are introduced into the second reactor 12 through the inlet 50. The optimum amounts of steam and hydrogen are 6 to 11 mols of steam and from 2 to 4 mols of hydrogen. Upon entering the reactor 12, the particles of $UO_2F_2$ and $U_3O_8$ form a bed 80 distributed throughout the lower portion 28 in a manner similar to that of the first reactor 10 and generally supported on a bubble cap plate 82.

Better conditions tending to cause the reactions to proceed to completion to uranium dioxide exist in the second reactor 12 because of the absence of $UF_6$ feed as occurs in the first reactor 10. The $UO_2F_2$ and $U_3O_8$ react with the steam and hydrogen to form uranium dioxide and hydrogen fluoride gas and water vapor with small but still significant amounts of $UO_2F_2$ remaining. The uranium dioxide particles with some $UO_2F_2$ present settle at the lower end of the second reactor 12, then enter the outlet conduit 18 from where they are conveyed to the third reactor 14, by an injection of gas, such as steam, via pipe 19 controlled by valve 21 into conduit 18. Some $UF_4$ and $U_3O_8$ are also present.

The HF gas, hydrogen, and steam vapor pass through the filters 64 which provide for separation from the solid reaction products therefrom, from there the gases are transmitted through the outlet conduit means 66 to the off-gas scrubber 70. It should be understood that cyclone separators, or electrostatic precipitators, can also be used separately or jointly with the filters 64-68 so long as the desired high collection efficiency with substantially no solids entering conduit 66 is achieved.

The product from the second reactor 12 consists of a fine particle $UO_2$ product with a residual fluorine content of up to about 0.50 w/o. An oxygen/uranium ratio of about 2.1 is obtained in these particles with a solids residence time in the reactor of from 6 to 10 hours at temperatures ranging from about 575° to 675° C with optimum temperature range being between 625° to 650° C.

THIRD REACTOR

The third reactor 14 receives the reaction products from the second reactor 12 via conduit 18 where, in the presence of additional steam and hydrogen, the reactions of equations (3), (4) and (5) occur for the production of the desired end product, namely $UO_2$. The maximum uranium throughput is about 0.7 pound mols per hour per square foot of cross-section of the reaction vessel. For a 10 inch diameter reaction vessel there was readily produced about 163 pounds of high quality $UO_2$ per hour, and up to 195 pounds of $UO_2$ per hour is feasible.

In reactor 14, a bed 84 composed of a mixture of particles of $UO_2$ and $U_3O_8$ with some traces of $UO_2F_2$ is supported on a bubble cap distribution plate 86 and has an upper level when fluidized near the upper end of the lower reaction portion 30.

The third reactor can include more than one fluidized bed in portion 30. Two or three distribution plates can be spaced within portion 30 with a downcomer pipe passing through each plate so that solid particles introduced above the topmost plate react with the steam and hydrogen, then pass through a downcomer pipe to the next lower fluidized bed, there reacted further toward completion of the reactions, and so on.

The temperature within the lower reactor portion 30 is maintained at in the range of from 575° to 675° C. The preferred temperature range is from 625° to 650° C.

For each mol of uranium brought in about 2 to 11 mols of steam and 0.5 to 6 mols of hydrogen are introduced via the inlet 52. Preferred amounts of steam and hydrogen comprise from 3 to 8 mols of steam and 1 to 3 mols of hydrogen per mol of uranium.

As the reaction proceeds, the hydrogen and steam complete the defluorination of the $UO_2$ particles and the resulting hydrogen, hydrogen fluoride gas and steam leave the reactor 14 through the filters 68 from where they are conducted to the off-gas scrubber 70.

The product from the third reactor consists of a small particle $UO_2$ product of high purity with a residual fluorine content of about 0.025 w/o or less. Fluorine contents of as low as 109 ppm have been obtained. The $UO_2$ particles are collected via line 76 in a bin 78 or conveyed directly to a hammer or attrition mill to produce a fine powder to be made into pellets by compressing and sintering at 1600° to 1800° C.

The $UO_2$ product of this fluid-bed process consists of granules of an average of about 250 microns in diameter, having a bulk density of about 3 gm/cc and a BET surface area of from about 1 to 2 m²/gm for the particle fraction of −45 to 60 mesh. The granules yield, with a single-pass hammer-milling, a ceramic-grade powder with bulk densities of about 1.5 gm/cc, BET surface areas of from about 2 sq. m/gm, and particle sizes averaging about 0.9 micron as determined by a Fisher sub-sieve sizer. High quality pellets are obtained with densities of up to about 96% of theoretical density by dry slugging, pressing at from 50,000 to 90,000 psi with 0.3 w/o lubricant (e.g., zinc stearate or polyvinyl alcohol) and sintering the compacts for four hours at 1650° C in hydrogen. The fluorine content is further reduced in the pellet sintering operation so that the fluorine content is 10 ppm or less.

The following example is illustrative of the present invention:

EXAMPLE

A three-reactor fluid-bed system as described was found to yield a low-fluorine uranium dioxide of good ceramic activity at $UF_6$ feed rates of up to 24 lbs./hr. in 6 inch diameter reactors (81 lbs.U/hr. sq. ft). Fluctuations in the $UF_6$ rate or other operating conditions made only minor differences in the final fluorine content of the powder.

Pilot runs were made in reactors using the fluidized bed technique of this invention to produce ceramic grade uranium dioxide powder. The operating conditions and product characteristics are shown in Table I.

Table I

| Test | SW-19 | SW-20 | SW-21 |
|---|---|---|---|
| 1st Reactor | | | |
| $UF_6$ rate (lbs/hr.) | 18 | 23 | 24 |
| Steam rate (lbs/hr.) | 6.3 | 6.3 | 6.3 |
| $H_2$ rate (lbs/hr.) | 0.55 | 0.48 | 0.55 |
| Bed temperature (°C) | 550 | 535 | 550 |
| Solids residence time (hr.) | 4.4 | 3.5 | 3.4 |
| Residual fluorine in product (w/o) | 8.0 | 7.7 | 7.5 |
| 2nd Reactor | | | |
| Steam rate (lbs/hr.) | 12.8 | 12.8 | 12.8 |
| $H_2$ rate (lbs/hr.) | 0.38 | 0.38 | 0.38 |
| Bed temperature (°C) | 640 | 640 | 630 |
| Solids residence time (hr.) | 10 | 7.8 | 7.6 |
| Residual fluorine in product (w/o) | 0.24 | 0.31 | 0.50 |
| 3rd Reactor | | | |
| Steam rate (lbs/hr.) | 12.8 | 12.8 | 12.8 |
| $H_2$ rate (lbs./hr.) | 0.38 | 0.38 | 0.38 |
| Bed temperature (°C) | 640 | 640 | 630 |
| Solids residence time (hr.) | 10 | 7.8 | 7.6 |
| Product: fluorine (w/o) | 0.015 | 0.011 | 0.015 |
| uranium (w/o) | 87.8 | 87.8 | 87.8 |
| O/U ratio | 2.07 | 2.05 | 2.05 |
| Density of sintered pellets* (% T.D.) | 93.5 | 93.2 | 92.1 |

*Pressed at 5 to 6 TSI and sintered for four hours at 1650° C.

The initial conversion of uranium hexafluoride to solids, comprising mainly $UO_2F_2$ and $U_3O_8$, is carried out in the primary reactor at the operating conditions and temperatures listed in Table I. The intermediate solid compounds, as indicated in equations (1) and (2), reacted to form mainly $UO_2$ in the second reactor at the temperatures indicated in Table I with additional steam and hydrogen. The primary influence upon the sintered density and uniform quality of the end product ($UO_2$), aside from carrying out the reaction under three separate reaction environments, is the effect of temperature, hydrogen, and steam rate in the three reactors as indicated in Table I. For comparison purposes, the reactor conditions and results of the three reactor system as listed in Table I is compared with test runs made for a two reactor system, as set forth in my U.S. Pat. No. 3,547,598, as shown in Table II, using 6 inch diameter reactors.

tent of from 0.011 to 0.015% for the three tests listed in Table I, which is less by a factor of 3 to 4 than the fluorine content of the best final product from the two reactor system.

The foregoing indicate that uranium dioxide powder of ceramic quality is readily produced in the triple fluidized bed process and that the powder quality as affects its ceramic properties is responsive to temperature and steam rate.

It is understood, however, that three or more fluidized beds may be used with the improved results indicated above over those secured with two fluidized beds. With four fluidized beds wherein the uranium dioxide from the third reactor is treated with steam and hydrogen in substantially the same proportions as in the third reactor at similar temperatures the fluorine content of the uranium oxide would be reduced by a factor of at least two over the results given previously for a three

Table II

| Test | SW-10B | SW-11A | SW-12 | SW-13 |
|---|---|---|---|---|
| 1st Reactor | | | | |
| $UF_6$ Rate (lbs/hr.) | 22 | 15 | 15 | 15 |
| Steam Rate (lbs/hr.) | 6.3 | 6.3 | 9.5 | 9.5 |
| $H_2$ Rate (lbs/hr.) | 0.55 | 0.55 | 0.55 | 0.55 |
| Bed Temperature (°C) | 550 | 550 | 570 | 450 |
| Solids residence time (hr.) | 3.5 | 5.0 | 6.0 | 6.0 |
| Residual fluorine in product (w/o) | — | 6.1 | 1.3 | 7.2 |
| 2nd Reactor | | | | |
| Steam Rate (lbs/hr.) | 12.6 | 10.8 | 10.8 | 13.5 |
| $H_2$ Rate (lbs/hr.) | 0.60 | 0.60 | 0.60 | 0.30 |
| Bed Temperature (°C) | 640 | 665 | 665 | 665 |
| Solids residence time (hr.) | 6.0 | 10 | 9.0 | 9.0 |
| Product fluorine (w/o) | 0.40 | 0.08 | 0.04 | 0.13 |

Table II shows the high fluorine content obtained with the two reactor system as equivalent $UF_6$ rates (SW-10B) and the reduced throughput and modified conditions required for achieving lower fluorine content (SW-11A, SW-12, and SW-13). Table II further shows that the fluorine content of the final product resulting from the two reactor system varies from about 0.04 to 0.40 w/o. The residual fluorine in the product from each stage of the two reactor system as shown in Table II compares substantially with the residual fluorine in the product of the first two reactors of the three reactor system as shown in Table I.

It is noted, however, that the product from the third reactor of the three reactor system has a fluorine confluidized bed reactor system, and for the highest degree of purity the uranium dioxide can be treated in a fifth reactor with additional steam and hydrogen.

The three reactors may vary in cross-sectional area across the fluidized bed from as little as 10 square inches to a square foot or more. Ordinarily each of the three reactors in a given system will usually be of the same cross-section in the fluidized bed zone. Because of criticality considerations, the more highly enriched uranium hexafluoride will usually be processed in the smaller reactors. Good results have been obtained with reactors having a six inch diameter across the fluidized bed, while in another case fluidized bed reactors of 10 inch diameter were employed.

For producing good ceramic grade $UO_2$ with low residual fluorine, in a three fluidized bed reactor system, it has been found that a throughput of up to about 250 lbs. per hour of $UF_6$ (about 170 lbs. of uranium) per square foot of fluidized bed cross-section is feasible. To react with this $UF_6$, there is required an input of up to about 77 pounds of steam per hour and up to about 7 lbs. of hydrogen per hour, both per square foot of fluidized bed cross-section in the first reactor. For near optimum reaction, the temperature of the first fluidized bed should be from 535° to 575° C, with the mol proportions of the reactants being from 3 to 6 mols of steam and 2 to 5 mols of hydrogen per mol of uranium hexafluoride. The reaction product of the first reactor comprises particles of $UO_2F_2$ and $U_3O_8$, as well as some $UO_2$ and $UF_4$.

In the second reactor into which the particles of $UO_2F_2$ and $U_3O_8$ and some $UO_2$ are introduced from the first reactor, there is injected up to about 141 lbs. of steam per hour and up to about 6 lbs. of hydrogen per hour, both per square foot of cross-section of the fluidized bed. The optimum reaction conditions in the second reactor occur at a fluidized bed temperature of from 625° to 650° C, while the mol ratios per mol of uranium are from 6 to 11 mols of steam and 2 to 4 mols of hydrogen.

The particles produced by reaction in the second reactor comprising primarily $UO_2$, with small amounts of $U_3O_8$ and $UO_2F_2$ and traces of $UF_4$, are conveyed from the second reactor to the third reactor and there reacted with more steam and hydrogen, in an amount of up to about 103 lbs. of steam per hour and up to about 4 lbs. of hydrogen per hour per square foot of cross-section of the fluidized bed. Optimum reaction occurs when the fluidized bed is at a temperature of from 625° to 650° C, and the mol ratios are 3 to 8 mols of steam and 1 to 3 mols of hydrogen per mol of uranium.

The gas pressure in the reactors is usually slightly above atmospheric. Good results are obtained at a gas pressure of 5 psig in the reactors.

When properly carried out, the three reactor system will recover about 99.9% of the $UF_6$ introduced into the first reactor as $UO_2$ powder having not over 0.025 weight percent of fluorine. Process specifications ordinarily call for a maximum of 0.03% fluorine in $UO_2$ powders to be made into fuel pellets. When comminuted in an attrition or other suitable mill, and compacted into pellets at a high pressure and sintered at 1600° to 1800° C in hydrogen this $UO_2$ produces pellets of from 90 to 96% of theoretical density with a final fluorine value of less than 10ppm.

Natural uranium hexafluoride, enriched uranium hexafluorides, and depleted uranium hexafluorides can be processed by the process of the present invention to produce ceramic grade $UO_2$.

Furthermore, no conveying of the off gases from the first reactors to the next succeeding fluidized bed reactor is necessary. Steam can be employed to convey the particles from conduit 58 to the second reactor. Thus all of the fluidized bed reactors can vent their exhaust gases through a filter and thence to a scrubber.

Accordingly, the process of the present invention embodies three coupled fluidized bed reactors which function more controllably to produce a better grade of $UO_2$ powder of a high ceramic quality than is possible with a single fluidized bed reactor or by any previously known fluidized bed reactor.

The entire reaction is carried out on a continuous process basis to produce $UO_2$ of a consistently uniform high quality.

It is understood that the above specification and drawings are merely exemplary and not in limitation of the invention.

I claim as my invention:

1. A process for converting uranium hexafluoride continuously to high quality ceramic-grade uranium dioxide having very low residual fluoride values comprising the steps of:
    a. establishing and maintaining in contact with a first fluidized bed a mixture consisting essentially of uranium hexafluoride, steam, and hydrogen in the proportions of 1 mol; 2 to 8 mols; 1 to 8 mols, respectively,
    b. concurrently heating the bed to a temperature ranging from about 475° to about 600° C to produce first intermediate reaction products including $UO_2F_2$ and $U_3O_8$,
    c. conveying the first intermediate reaction products to a second fluidized bed,
    d. establishing and maintaining a second fluidized bed comprising a mixture of the first intermediate reaction products and additional steam and hydrogen, to provide from about 4 to 12 mols of steam and from about 1 to 6 mols of hydrogen per mol of uranium,
    e. concurrently heating the second bed to a temperature ranging from about 575° to about 650° C to produce second intermediate reaction products including $UO_2$,
    f. conveying the second intermediate products to a third fluidized bed,
    g. establishing and maintaining a third fluidized bed comprising a mixture of the second intermediate reaction products and additional steam and hydrogen, to provide from about 2 to 11 mols of steam and from about 0.5 to 6 mols of hydrogen per mol of uranium, and
    h. concurrently heating the third bed to a temperature ranging from about 575° to about 650° C to produce ceramic-grade uranium dioxide capable of being formed into compacts and fired into pellets having a density of from 90% to 96% of theoretical density and a recovery of greater than 99.9% uranium.

2. The process of claim 1 wherein the relative proportions of steam and hydrogen per mol of $UF_6$ in the first fluidized bed are from 3 to 6 mols of steam and 2 to 5 mols of hydrogen.

3. The process of claim 1 wherein the relative amounts of steam and hydrogen per mol of uranium in the second fluidizing bed are from about 6 to 11 and 2 to 4, respectively.

4. The process of claim 1 wherein the relative amounts of steam and hydrogen per mol of uranium in the third fluidized bed are from about 3 to 8 mols of steam and from about 1 to 3 mols of hydrogen.

5. The process of claim 1, wherein the first fluidized bed is operated at a temperature ranging from 535° to 550° C.

6. The process of claim 1, wherein the second fluidized bed is operated at a temperature ranging from 630° C to 640° C.

7. The process of claim 1, wherein the third fluidized bed is operated at a temperature ranging from 630° C to 640° C.

8. A process for converting uranium hexafluoride continuously to high quality ceramic-grade uranium dioxide having very low residual fluoride values comprising the steps of:
   a. establishing and maintaining in contact with a first fluidized bed a gaseous mixture of from about 18 to 24 lbs./hr. of $UF_6$, about 6.3 lbs./hr. of steam and of from about 0.48 to 0.55 lbs./hr. of hydrogen,
   b. concurrently heating the bed to a temperature ranging from about 475° to about 600° C to produce first intermediate reaction products including $UO_2F_2$ and $U_3O_8$,
   c. conveying the first intermediate reaction products to a second fluidized bed,
   d. establishing and maintaining a second fluidized bed comprising a mixture of the intermediate reaction products from step (b) in contact with steam and hydrogen, there being introduced about 12.8 lbs./hr. of steam and about 0.38 lbs./hr. of hydrogen,
   e. concurrently heating the second fluidized bed to a temperature ranging from about 575° to 650° C to produce second intermediate reaction products including $U_3O_8$ and $UO_2$,
   f. conveying the second intermediate reaction products to a third fluidized bed,
   g. establishing and maintaining a third fluidized bed comprising a mixture of the second-intermediate reaction products from step (e) in contact with steam and hydrogen, there being introduced about 12.8 lbs./hr. of steam and about 0.38 lbs./hr. of hydrogen, and
   h. concurrently heating the third fluidized bed to a temperature ranging from 575° to 650° C to produce fine particles of ceramic-grade $UO_2$ capable of being readily formed into compacts and fired into pellets having a density of 90 to 96% of theoretical density and having residual fluorine values of not over about 0.015 weight percent.

9. The process of claim 1 wherein the product from the third fluidized bed reactor is conveyed to a fourth fluidized bed reactor and reacted with additional steam and hydrogen at temperatures similar to those in the third reactor.

* * * * *